United States Patent [19]

Inoue

[11] 4,398,350
[45] Aug. 16, 1983

[54] CENTERING CONTROLLER FOR A TOOL ELECTRODE ON AN ELECTRICAL MACHINE TOOL

[75] Inventor: Kiyoshi Inoue, Tokyo, Japan

[73] Assignee: Inoue-Japax Research Incorporated, Yokohama, Japan

[21] Appl. No.: 230,104

[22] Filed: Jan. 29, 1981

[51] Int. Cl.³ .............................................. G01B 7/31
[52] U.S. Cl. ............................... 33/185 R; 33/172 D; 219/69 E
[58] Field of Search ............ 33/185 R, 199 R, 172 D; 219/69 R, 69 E, 69 M

[56] References Cited

U.S. PATENT DOCUMENTS

| 2,826,822 | 3/1958 | Noviant | 33/199 R |
| 3,206,857 | 9/1965 | Kaye | 33/172 D X |
| 4,301,350 | 11/1981 | Fujikawa | 219/69 E |

Primary Examiner—William D. Martin, Jr.
Attorney, Agent, or Firm—Karl F. Ross; Herbert Dubno

[57] ABSTRACT

A positioning device for a tool electrode on an electrical machine tool, comprising: a tool head and a swivel electrode support for securely holding the tool electrode and adapted to be swivelably carried by the tool head whereby to allow the axis of the tool electrode to be swung relative to the tool head about a fulcrum lying on the axis of the latter. An electrode centering assembly is used to align the axis of the tool electrode with the axis of the tool head and comprises a plurality of axial drive units operative for displacement and pressurization along the respective radially equi-spaced axes, each unit comprising a pressure plate having a pressure surface extending in parallel with the axis of the tool head and slidably received in a casing and resiliently supported thereby to maintain the parallelism. Motors are used to conjointly advance the casings to displace the pressure plates towards and urge them against the tool electrode. The parallel surfaces of the pressure plates urged against the tool electrode thus rotate the latter about the fulcrum to bring it parallel with the pressure surfaces and hence into a precise axial alignment with the tool head. Support retainer means is coupled to the tool head and actuatable, after establishment of the axial alignment or parallelism, to fixedly secure the swivel electrode support to the tool head.

11 Claims, 5 Drawing Figures

CENTERING CONTROLLER FOR A TOOL ELECTRODE ON AN ELECTRICAL MACHINE TOOL

FIELD OF THE INVENTION

The present invention relates to a centering controller for a tool electrode on an electrical machine tool, e.g. an EDM or ECM machine tool. More particularly, the invention relates to a positioning device for a tool electrode in the form of a two- or three-dimensionally shaped block or sheet material, a wire which may be either continuous or discrete, or a simple rod used to electrically machine a workpiece.

BACKGROUND OF THE INVENTION

A tool electrode at the start of a given machining operation or on the occasion of exchanging it for a previous electrode during a given machining operation must be mounted on an electrical machine tool precisely so that it can be positioned in a predetermined alignment or centering relationship with a workpiece or a tool head. Heretofore, this has necessitated repeated loosening and tightening of bolts on a chucking member or device for securing the tool electrode to the tool head or spindle. Indicators must also be employed to measure a deviation in alignment to assist the manual centering correction of the tool electrode relative to predetermined reference surfaces. Such practice has, however, been bothersome to the operator and may not necessarily assure the required centering or alignment correction.

OBJECT OF THE INVENTION

It is accordingly an important object of the present invention to provide an improved centering controller or positioning device for a tool electrode on an electrical machine tool, which is more convenient and efficient in use than conventional means to achieve the desired electrode centering or alignment operation for electrical machining.

SUMMARY OF THE INVENTION

In accordance with the present invention, there is provided a positioning device for a tool electrode on an electrical machine, which comprises: a tool head; a swivel electrode support for securely holding the tool electrode and adapted to be swivelably carried by the tool head whereby to allow the axis of the tool electrode to be swung relative to the tool head; electrode centering means adapted for engagement with the tool electrode for positioning the tool electrode in a predetermined axial alignment with an axis of the tool head intersecting the center of swing of the swivel support; and support retainer means coupled to the tool head and actuatable, after establishment of the aforesaid axial alignment by the tool electrode with the axis of the tool head to fixedly secure the swivel support to the tool head.

The electrode centering means may comprise a plurality of axial drive units operative for displacement and pressurization along a predetermined number of axes, respectively, each unit comprising a pressure plate slidably received in a casing and resiliently supported thereby and motor means for displacing the casing towards the tool electrode. The electrode centering means may further include a control unit for operating the motor means in the axial drive units to locate the casings initially at positions spaced by an equal distance from a desired position of the axis of the tool electrode which can be ascertained in terms of machining coordinates on the workpiece or a worktable but advantageously in terms of the axis of the tool head and then to cause the individual casings to be advanced by a predetermined equal distance, thereby urging the respective pressure plates against the tool electrode and permitting the latter to be balanced and held in position to establish the desired axial position. The support retainer means then is operated to fix the swivel support to the tool head. Each of the pressure plates for engagement with the tool electrode has a contact surface in parallel with the desired tool axis, the plate surfaces being preferably comb-shaped with teeth of one plate surface arranged to be transverse to teeth of adjacent plate surfaces to permit them to be advanced in engagement and without interference from one another.

The swivel electrode support at its one end portion may be formed with a fulcrum member, desirably in the form of a sphere, slidably received in a support member of the tool head to allow its other end portion to which the tool electrode is secured to be swung. The support retainer means is preferably constituted by a magnetic retainer arrangement and, to this end, an interspace between the fulcrum member of the swivel electrode support and the support member of the tool head may be filled with a powder of magnetic particles. Coil means may then be arranged, in or on the support member, and energized by a power supply to activate the magnetic particles and to consolidate them by the mutual magnetic attractions, thereby frictionally clamping the swivel electrode support with the centered tool electrode to the tool head. The magnetic retainer arrangement may alternatively make use of electromagnetic brake means comprising one or more frictional brake pads projecting from the tool head into engagement with the fulcrum member. In the state of release of the electromagnetic system, the pads remain retracted to allow a sliding motion of the fulcrum member within the support member to permit the swivel electrode support to the swung. When the tool electrode is centered in precision alignment with the desired axis, the electromagnet system is actuated to urge the brake pads firmly against the fulcrum member to securely fix the swivel support with the centered tool electrode to the tool head.

BRIEF DESCRIPTION OF THE DRAWING

These and other objects, features and advantages of the present invention will become more readily apparent from the following description of certain embodiments thereof taken with reference to the accompanying drawing in which.

SPECIFIC DESCRIPTION

Figure 1:
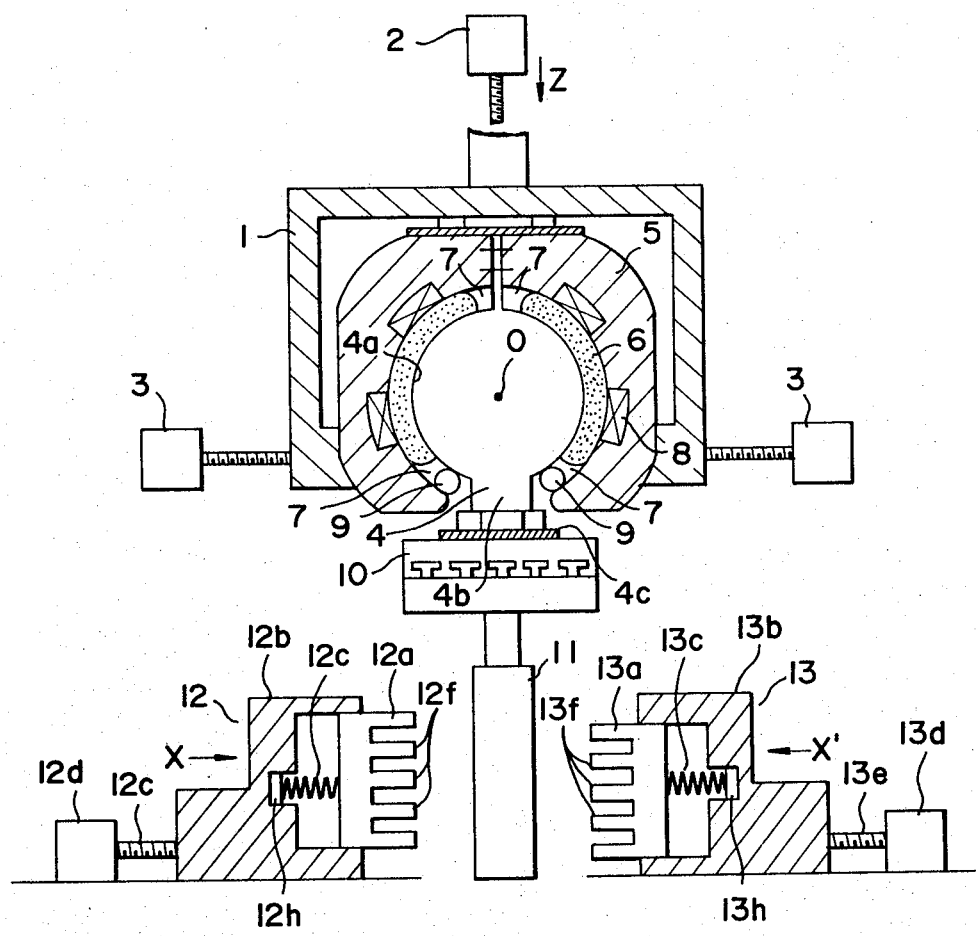
FIG. 1 is a schematic view, essentially in section, diagrammatically illustrating an embodiment of the invention including an electrode centering means.

The embodiment of the invention shown in FIG. 1 includes a tool head 1 movable in the vertical direction or along a Z-axis by means of a motor 2 and from the right to the left and vice versa by means of motors 3. The tool head 1 may also be movable in a direction perpendicular to the sheet of the drawing by means of a motor or motors not shown. A swivel electrode support 4 has at its top a fulcrum member 4a in the form of a sphere slidably received in a support member 5 secured to or arranged as a part of, the tool head 1. The support member 5 is here composed of a non-magnetic material 7. A powder of ferromagnetic particles 6 is filled within a space between the fulcrum member 4a and the support member 5 which are held apart by means of bearings 9 which also serve to hold the powder 6 against flow-out. The support member 5 has a plurality of windings 8 embedded therein which may be connected in series and are energized by a power supply not shown.

The swivel support 4 has its lower end 4b secured via an electrical insulator 4c to an electrode chuck 10 to which a tool electrode 11 is securely mounted by means of bolting and magnetic chucking in a usual manner. The center 0 of the sphere 4a or the fulcrum of the swivel support 4 lies or falls on the Z-axis along which the tool head 1 is displaceable in the vertical direction by means of the motor 2.

An electrode centering assembly shown in FIG. 1 includes an X-axis drive unit 12 for displacement and pressurization along an X-axis and an X'-axis drive unit for displacement and pressurization along an X'-axis which is opposed to the X-axis. Each unit 12, 13 comprises a pressure plate 12a, 13a slidably received in a casing 12b, 13b and supported thereby resiliently by means of a spring 12c, 13c. Each casing 12b, 13b is carried on a worktable (not shown) on which a workpiece (not shown) is securely mounted or to be mounted and which lies in a plane (X-Y plane) perpendicular to the Z-axis and providing an X-Y machining coordinate system. Each casing 12b, 13b is driven by a motor 12d, 13d via a lead screw 12e, 13e to displace the pressure plate 12a, 13b towards and then against the tool electrode 11. Each pressure surface 12f, 13f of the plate 12a, 13b lies perpendicular to the worktable or the X-Y plane and hence in parallel with the Z-axis. Each pressure plate 12a, 13a is received in its casing 12b, 13b so as to always keep this perpendicularity or parallelism after its pressure surface 12f, 13f comes into engagement with the tool electrode 11 and is urged against the latter under the actions of the associated drive motor 12d, 13d and spring 12c, 13c.

Figure 2:
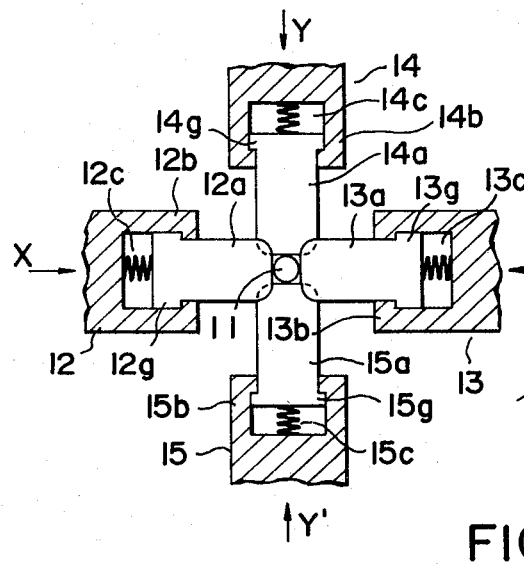
FIG. 2 is a schematic plan view of the electrode centering means of FIG. 1 and a slender tool electrode centered thereby.

The electrode centering assembly of FIG. 1 is similarly provided, as shown in FIG. 2, with a Y-axis drive unit 14 for displacement and pressurisation along a Y-axis and a Y'-axis drive unit 15 for displacement and pressurization along a Y'-axis which is opposed to the Y-axis, each unit 14, 15 comprising a pressure plate 14a, 15a; a casing 14b, 15b; a spring 14c, 15c; a drive unit 14d, 15d (not shown in FIG. 2); and a lead screw 14e, 15e (not shown in FIG. 2), identically with the unit 12, 13. The pressure plate 12a, 13a, 14a, 15a is formed with its pressure surface 12f, 13f, 14f, 15f which is preferably comb-shaped as shown in FIG. 1 for 12f, 13f so that teeth on one such surface are offset from and can interdizitate with those on adjacent surfaces to avoid interference from one another when the surfaces are brought close together as shown in FIG. 2. A stop 12g, 13g, 14g, 15g is also shown formed in each casing 12b, 13b, 14b, 15b to prevent the pressure plate or block 12a, 13a, 14a, 15a from sliding of the casing. The springs 12c, 13c, 14c and 15c are precisely of an identical elasticity to allow the pressure plates or blocks 12a, 13a, 14a and 15a to normally project by an identical distance from the casings 12b, 13b, 14b and 15b, respectively and to impose equal spring forces against a contacted object under equal drive forces to the casings.

In operation of the device shown, the tool electrode 11 secured to the support 4 is capable of being freely swung about the fulcrum O of the member 4a with a small external force when the magnetic coils 8 are de-energized. Then, the drive motors 12d, 13d, 14d and 15d in the respective units 12, 13, 14 and 15 are operated to locate the casings 12b, 13b, 14b and 15b or the pressure surfaces 12f, 13f, 14f and 15f of the respective pressure plates or blocks 12a, 13a, 14a and 15a away from the Z-axis by an equal predetermined distance. The motors then operate to drive the blocks individually towards the tool electrode 11 which may be in disalignment with the Z-axis. The motors are set to displace the blocks individually by a second equal predetermined distance which is smaller than the first-mentioned predetermined distance but is sufficient for all the pressure surfaces to advance beyond their positions of initial contact with the tool electrode 11. In the course of displacement, the tool electrode 11 is contacted by the pressure plates and thereafter by virtue of the continued drive by the motors is finally balanced in position under the elastic action exerted by the springs 12c, 13c, 14c and 15c to occupy the desired centering orientation.

The assembly of FIG. 1 is also shown further including as optional contact sensors 12h and 13h associated with the springs 12c and 13c of the units 12 and 13, respectively, it being understood that such sensors are then also provided in units 14 and 15 shown in FIG. 2 as well. The sensors 12h and 13h are each designed to provide an electrical signal when pressed as a result of the contact of the pressure plates 12a, 13a with an object.

Each of the drive motors 12d, 13d 14d and 15d is a stepping motor or a DC motor equipped with an encoder to permit an incremental or digitial displacement.

Figure 4:
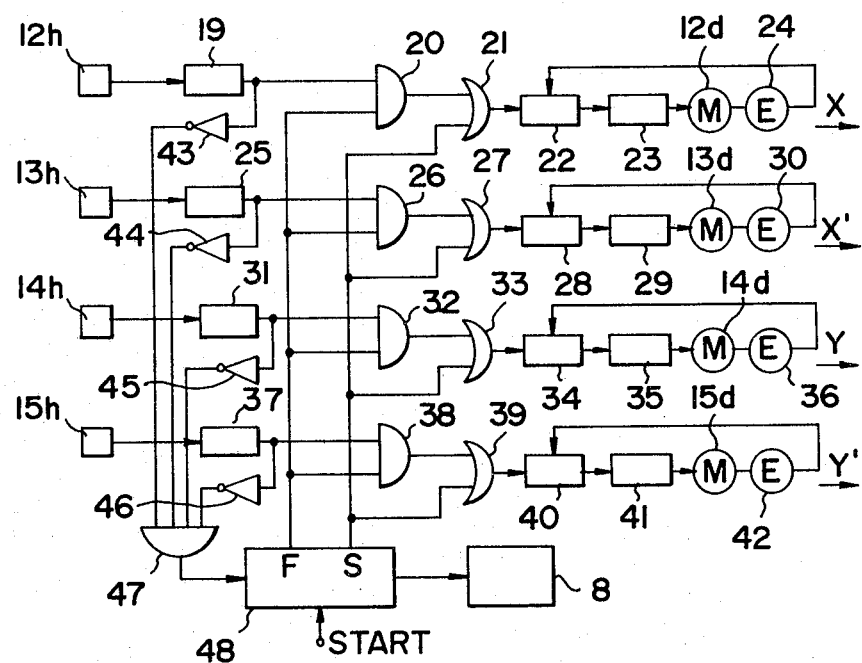
FIG. 4 is a circuit diagram of a multi-axial drive unit for the electrode centering means of FIGS. 1 and 2.

In FIG. 4 there is shown a drive control circuit for operating the drive motors 12d, 13d, 14d and 15d in conjunction with the contact sensors 12h, 13h, 14h and 15h. The circuit includes discriminators 19, 25, 31, 37 each responsive to the associated contact sensor 12h, 13h, 14h, 15h and each having an output leading to a first input terminal of an AND gate 20, 26, 32, 38 which has an output leading to a first input terminal of and OR gates 21, 27, 33, 39. Each of the OR gate 21, 27, 33 and 39 has its output connected to a differential counter 22, 28, 34, 40 leading to a drive circuit 23, 29, 35, 41 for the motor 12d, 13d, 14d, 15d. Each of the motors 12d, 13d, 14d and 15d is shown equipped with an encoder 24, 30, 36, 42 whose output is fed back to the associated differential counter 22, 28, 34, 40. The outputs of the discriminators 19, 25, 31 and 37 are also fed via NOT gates 43, 44, 45 and 46, respectively, and linked together by an AND gate 47 whose output is led to a command circuit 48. The latter has a first output terminal F connected to the second input terminals of AND gates 20, 26, 32 and 38 and a second output terminal S connected to the second input terminals of OR gates 21, 27, 33 and 39. A further output of the command circuit 48 is used to energize the electromagnetic windings 8 shown in FIG. 1.

The drive control circuit of FIG. 4 commences operating when an input arrives at the "START" terminal of the command circuit 48. Drive commands are issued from the command unit 48 and applied on one hand to AND gates 20, 26, 32 and 38 from the terminal F and on the other hand to OR gates 21, 27, 33 and 39 from the terminal S. The drive commands are thus applied to the counters 22, 28, 34 and 40 and in turn to driver circuits 23, 29, 35 and 41 to operate motors 12$d$, 13$d$, 14$d$ and 15$d$, thereby advancing the units 12, 13, 14 and 15 towards the tool electrode 11. Each encoder 24, 30, 36, 42 senses an angular displacement of the associated motor 12$d$, 13$d$, 14$d$, 15$d$ and feeds back the sensing signal to the differential counter 22, 28, 34, 40 to count down the input drive commands, whereby to insure a stabilized incremental displacement for each of the units 12, 13, 14 and 15.

When any one of the pressure plates 12$a$, 13$a$, 14$a$ and 15$a$ comes in contact with the tool electrode 11, the corresponding contact sensor 12$h$, 13$h$, 14$h$, 15$h$ is actuated to cause the corresponding discriminator 19, 25, 31, 37, to provide an "O" output which is applied on one hand to the AND gate 20, 26, 32, 38 thereby disabling the same and on the other hand via the NOT gate or inverter 43, 44, 45, 46 to the AND gate 47. The command circuit 48 continues to provide via the terminal S and the OR gates 21, 27, 33 and 39 drive commands to the motors 12$d$, 13$d$, 14$d$ and 15$d$, permitting the tool electrode 11 to be driven with the pressure plate or plates 12$a$, 13$a$, 14$a$ and/or 15$a$ having come in contact therewith and thus to be brought into alignment with the desired axis coincident with the Z-axis. When all of the contact sensors 12$h$, 13$h$, 14$h$ and 15$h$ are actuated indicating that all the pressure plates 12$a$, 13$a$, 14$a$ and 15$a$ are in pressure engagement with the tool electrode 1 or the latter becomes substantially centered with the desired axis, the AND gate 47 is turned to provide a "1" output which is applied to the command circuit 48. The latter then provides an "O" output through the terminal F to the AND gates 20, 26, 32 and 38, thereby disabling them while providing renewed drive commands through the terminal S. The renewed drive commands are a set of drive signals applied to the drive circuits 23, 29, 35 and 41 for the motors 12$d$, 13$d$, 14$d$ and 15$d$ to displace the casings 12$b$, 13$b$, 14$b$ and 15$b$ by a preset equal distance whereby the tool electrode 11 is brought to a final centering position under the balancing forces of the springs 12$c$, 13$c$, 14$c$ and 15$c$. When this position is reached, the command source 48 provides a further output to permit the electromagnetic windings 8 (FIG. 1) to be energized, thereby magnetically clamping the swivel support 4 to the support member 5 and hence the tool electrode 11 to the tool head 1.

When the windings 8 are energized, magnetic fluxes are created through the region of the space between the fulcrum member 4$a$ and the support member 5 to magnetically consolidate the powder of the ferromagnetic particles 6 filling that space, whereby to clamp the fulcrum member 4$a$ to the support member 5.

Figure 3:
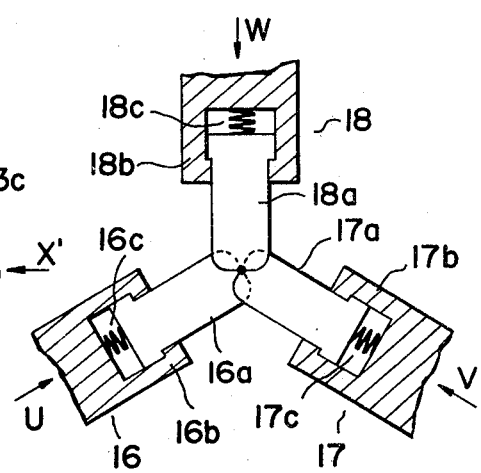
FIG. 3 is a schematic plan view illustrating another form of the electrode centering means used with a wire tool electrode centered thereby.

FIG. 3 shows a modified electrode centering assembly wherein three units 16, 17 and 18 are employed for displacement and pressurization in three equi-spaced radial directions indicated by arrows or along U-, V- and W-axes, respectively. Each unit is similar to those shown in FIGS. 1 and 2 and comprises a pressure plate or block 16$a$, 17$a$, 18$a$; a casing 16$b$, 17$b$, 18$b$; a spring 16$c$, 17$c$, 18$c$; a drive motor (not shown) and a lead screw (not shown) and operates in a similar manner as described.

A tool electrode of practically any farm and size can be centered according to the present invention. As already described, it is advantageous to employ a pressure plate or block 12$a$, 13$a$, 14$a$, 15$a$, 16$a$, 17$a$, 18$a$ which is comb-shaped so that the teeth on one are offset from those on adjacent ones as shown in FIGS. 1, 2 and 3. This permits centering and clamping of a slender electrode 11 as illustrated in FIGS. 2 and 3 with ease and enables a tool electrode which is not symmetrical about the axis to be satisfactorily centered and clamped with the arrangement shown. Thus, by advancing the units 12, 13, 14 and 15 or 16, 17 and 18 by a predetermined equal distance after establishment of the contact by the pressure plates 12$a$, 13$a$, 14$a$ and 15$a$ or 16$a$, 17$a$ and 18$a$ with such a tool electrode, the springs 12$c$, 13$c$, 14$c$ and 15$c$ or 16$c$, 17$c$ and 18$c$ are capable of exerting an equal pressure on the electrode. Under a uniform pressurization the tool electrode is balanced in position to achieve the desired centering alignment. The magnetic assembly 8, 6 can then be activated to clamp the swivel support 4 to the support member 5 of the tool head 1 to hold the tool electrode on the Z-axis.

The springs shown for balancing pressurization can be replaced by other elastic members such as rubber pieces or air-filled bays. The contact sensors can be embodied as optical sensors, electromagnetic proximity switches or pressure sensors. The drive control circuit can be constituted by a CNC, DNC or NC system operated under programmed commands to judge input signals and to control the drive motors. The drive motors may also be operated in any manner until the pressure plates or blocks are brought into contact with the tool electrode. For example, one of the directionally opposed units is initially located in contact with the tool electrode and the other initially spaced apart is advanced to come in contact with the tool electrode. The operation can be performed either under program control or manually.

The magnetic clamping assembly shown and described which makes use of a powder of ferromagnetic particles 6 filled within the spacing between the fulcrum member 4$a$ and the support member 5 and energized by windings 8 is extremely advantageous. Upon energization of the windings 8, the powder 6 is magnetically activated to provide magnetic attractions between the adjacent particles so that they become consolidated and act to firmly clamp the swivel support 4 to the tool head 1. Upon deenergization of the windings 8, the particles in the powder 6 are capable of flowing freely in the spacing to permit movement of the swivel support 4 with respect to the support member 5 with ease. In the clamping state, no external force is required to retain the established centering position of the tool electrode 11. A powdery or liquid lubricating material may be added to and mixed with the powder of ferromagnetic particles 6 to improve the fluidity of the latter to facilitate movement between the members 4$a$ and 5 when the windings 8 are de-energized.

Figure 5:
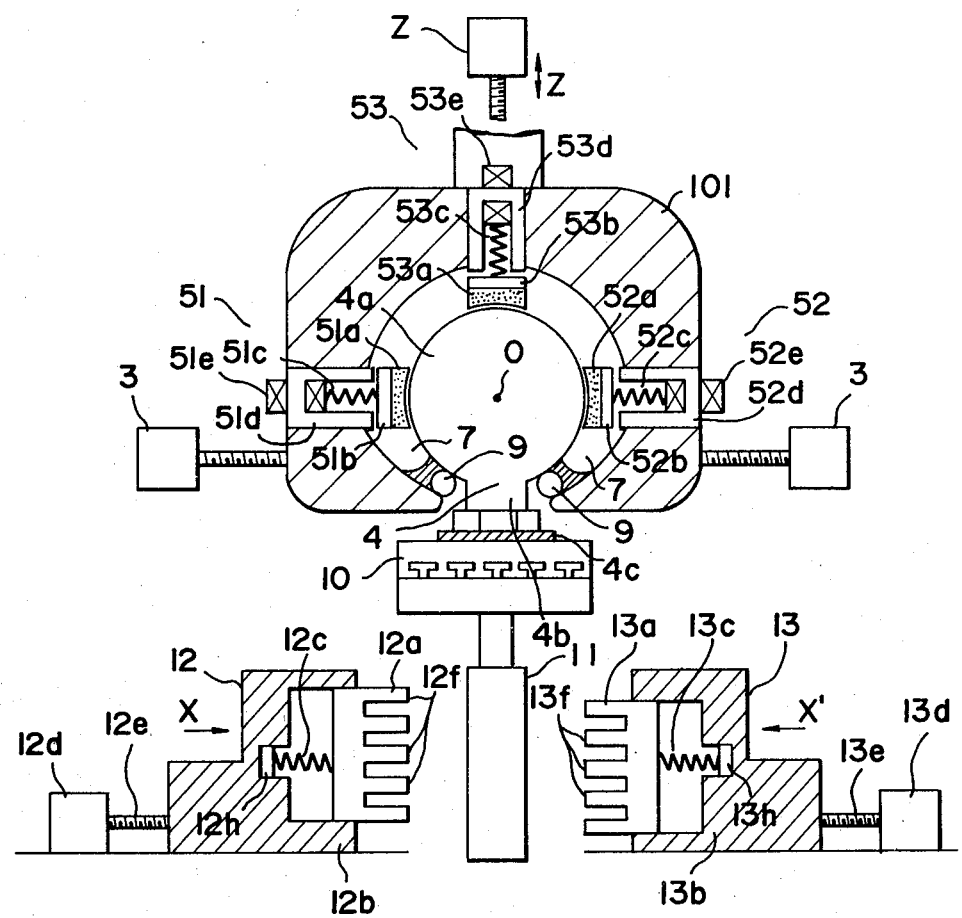
FIG. 5 is a schematic view, essentially in section, diagrammatically illustrating a further embodiment of the invention.

In a modified embodiment shown in FIG. 5 in which same reference numerals and characters are used to designate the same elements or parts as shown in the previous FIGURES, the tool head 101 incorporates a modified retainer structure consituted by braking units 51, 52 and 53 for the fulcrum member 4a of the swivel electrode support 4. Each unit 51, 52, 53 comprises a frictional pad 51a, 52a, 53a attached to an armature 51b, 52b, 53b supported on the tool head 101 by means of a spring 51c, 52c, 53c. The armature 51b, 52b, 53b carrying the frictional pad 51a, 52a, 53a co-operates with a yoke 51d, 52d, 53d on which a coil 51e, 52e, 53e is wound for energization by a power supply (not shown). Thus, when the coils 51e, 52e and 53e are de-energized, the springs 51c, 52c and 53c press the frictional pads 51a, 52a and 53a against the spherical fulcrum member 4a of the swivel support 4. When the coils 51e, 52e and 53e are energized, the armatures 51b, 52b and 53b are magnetically attracted to the yokes 51d, 52d and 53d away from the flucrum member 4a against the springs 51c, 52c and 53c, thereby permitting the tool electrode 11 supported by the support 4 to be swung with a small external force. The electrode centering assembly constituted by units 12, 13, 14 and 15 is of the structure and function already described and is then used to precisely align the tool electrode 11 coaxial with the Z-axis in the manner already described. The electromagnetic coils 51e, 52e and 53e are then deenergized to release the magnetic attraction of the armatures 51b, 52b and 53b to the yoke 51d, 52d and 53d, thereby permitting the frictional pads 51a, 52a and 53a to be pressed against the fulcrum member 4a under the pressure of the springs 51c, 52c and 53c and holding the swivel support 4 and the tool electrode accurately centered in position.

What is claimed is:

1. A positioning device for orienting an axial member so as to be precisely in alignment with a predetermined axial direction, comprising:
    a head member having an axis conciding with said predetermined directions;
    a swivel support for securely holding said axial member, said support being adapted to be swivelably carried by said head member whereby to allow the axis of said axial member to be swung about a center of swing relative to said axis of the head member;
    centering means comprising:
    a plurality of casings which are displaceable, in a plane, along a plurality of axes, respectively, which are orthogonal to and equispaced radially about, said axis of the head member,
    a plurality of pressure plates which have their respective pressure surfaces extending in parallel with said axis of the head member and which are received slidably and supported resiliently by elastic means, in said respective casings so as to maintain said respective parallelisms, and
    means for advancing said casings respectively towards said axial member to allow said respective pressure plates to bear along said pressure surfaces against said axial member individually and then to conjointly come into pressure engagement therewith until after the pressures exerted by said respective elastic means via said respective plates on said axial member are equalized; and
    support retainer means coupled to said head member and adapted to be actuated, after said equalization of the pressure by said elastic means, to fixedly secure said swivel support to said head member.

2. The device defined in claim 1 wherein said advancing means comprises:
    a plurality of motors for advancing said casings respectively;
    a drive circuit for supplying drive signals to said motors to conjointly advance said casings;
    a contact sensor associated with each of said pressure plates for providing an electrical signal upon each of said pressure plates coming into a predetermined pressure engagement with said axial member; and
    a control circuit responsive to development of such electrical signals by all of said contact sensors for acting on said drive circuit for said motors to move said casings by a predetermined equal distance to hold with said pressure surfaces said axial member centered in alignment with said axis of the head member, whereafter permitting said support retainer means to fixedly secure said swivel support to said head member.

3. A positioning device for orienting an axial member so as to be precisely in alignment with a predetermined axial direction, comprising:
    a head member having an axis coinciding with said predetermined direction;
    a swivel support for securely holding said axial member, said support being adapted to be swivelably carried by said head member whereby to allow the axis of said axial member to be swung about a center of swing relative to said axis of the head member, said swivel support having at one end portion thereof a fulcrum member in the form of a sphere defining at its center said center of swing and having the other end portion thereof secured to said axial member to permit the latter to be swung, said fulcrum member being slidably received in a support surface therefor of said head member;
    centering means adapted for engagement with said axial member for positioning said axial member in an axial alignment with said axis of the head member intersecting said center of swing of said head member; and
    support retainer means coupled to said head member and adapted to be actuated, after establishment of said axial alignment of the axial member with said axis of the head member, to fixedly secure said swivel support to said head member, said retainer means comprising a powder of ferromagnetic particles disposed to fill at least a portion of the spacing between said fulcrum member and said support surface of the head member and coil means energizable by a power supply to magnetically consolidate said powder of ferromagnetic particles, thereby frictionally clamping said fulcrum member to said support surface and deenergizable to release said frictional clamping.

4. The device defined in claim 3 wherein said retainer means further comprises bearing means between said fulcrum member and said support surface for preventing said powder from flowing out of said spacing when said coil means is de-energized.

5. A positioning device for orienting an axial member so as to be precisely in alignment with a predetermined axial direction, comprising:
    a head member having an axis coinciding with said predetermined directions;
    a swivel support for securely holding said axial member, said support being adapted to be swivelably carried by said head member whereby to allow the axis of said axial member to be swung about a center of swing, relative to said axis of the head member, said swivel support having at one end portion thereof a fulcrum member in the form of a sphere defining at its center said center of swing and having the other end portion thereof secured to said axial member to permit the latter to be swung, said fulcrum member being slidably received in a support surface therefor of said head member;

centering means adapted for engagement with said axial member for positioning said axial member in an axial alignment with said axis of the head member intersecting said center of swing of said head member; and support retainer means coupled to said head member and adapted to be actuated, after establishment of said axial alignment of the axial member with said axis of the head member, to fixedly secure said swivel support to said head member, said retainer means comprising a frictional pad secured to an armature resiliently supported on said support surface by spring means of press said frictional pad against said fulcrum member, thereby holding the latter to said head member, and solenoid means operatively associated with said armature against said spring means to disengage said frictional pad from said fulcrum member, thereby releasing said swivel support from said head member.

6. The device defined in claim 1 or claim 2 wherein said pressure surfaces of said pressure plates are individually comb-shaped longitudinally of said axial member with teeth of one such plate surface being arranged to be transverse to those of such plate surfaces adjacent thereto to permit them to be advanced in engagement and without interference with each other.

7. The device defined in claim 2 wherein said swivel support has at one end portion thereof a fulcrum member in the form of a sphere defining at its center said center of swing and has the other end portion thereof secured to said axial member to permit the latter to be swung.

8. The device defined in claim 7 wherein said fulcrum member is slidably received in a support surface therefor of said head member.

9. The device defined in claim 8 wherein said retainer means comprises a powder of ferromagnetic particles disposed to fill at least a portion of the spacing between said fulcrum member and said support surface of the head member and coil means energizable by a power supply to magnetically consolidate said powder of ferromagnetic particles, thereby frictionally clamping said fulcrum member to said support surface and de-energizable to release said frictional clamping.

10. The device defined in claim 9 wherein said retainer means further comprises bearing means between said fulcrum member and said support surface for preventing said powder from flowing out of said spacing when said coil means is de-energized.

11. The device defined in claim 8 wherein said retainer means comprises a frictional pad secured to an armature resiliently supported on said support surface by means of a spring means to press said frictional pad against said fulcrum member, thereby holding the latter to said head member and a solenoid means operatively associated with said armature and energizable by a power supply to retract said armature against said spring means to disengage said frictional pad from said fulcrum member, thereby releasing said swivel support from said head member.

* * * * *